(12) United States Patent
Kawanori et al.

(10) Patent No.: US 10,090,726 B2
(45) Date of Patent: Oct. 2, 2018

(54) MOTOR AND AIR-CONDITIONING APPARATUS

(71) Applicant: Mitsubishi Electric Corporation, Tokyo (JP)

(72) Inventors: Yukihiko Kawanori, Tokyo (JP); Hironori Yabuuchi, Tokyo (JP); Nobuaki Miyake, Tokyo (JP); Kazuhiko Baba, Tokyo (JP); Tomoki Hayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 186 days.

(21) Appl. No.: 14/889,873

(22) PCT Filed: Jul. 3, 2013

(86) PCT No.: PCT/JP2013/068293
§ 371 (c)(1),
(2) Date: Nov. 9, 2015

(87) PCT Pub. No.: WO2015/001636
PCT Pub. Date: Jan. 8, 2015

(65) Prior Publication Data
US 2016/0126798 A1    May 5, 2016

(51) Int. Cl.
*H02K 5/08* (2006.01)
*H02K 5/16* (2006.01)
(Continued)

(52) U.S. Cl.
CPC ............. *H02K 5/161* (2013.01); *F25B 31/02* (2013.01); *H02K 5/08* (2013.01); *H02K 5/10* (2013.01); *H02K 5/1732* (2013.01)

(58) Field of Classification Search
CPC ............. H02K 5/08; H02K 5/24; H02K 5/161
See application file for complete search history.

(56) References Cited

U.S. PATENT DOCUMENTS 4,015,154 A * 3/1977 Tanaka .................. H02K 15/00
                                                         264/272.2
7,437,882 B2 * 10/2008 Matsunaga ......... F04C 18/0215
                                                          310/156.78
(Continued)

FOREIGN PATENT DOCUMENTS

CN          101231015 A       7/2008
CN          201118328 Y       9/2008
(Continued)

OTHER PUBLICATIONS

Extended European Search Report dated Mar. 9, 2017 in the corresponding European patent application No. 13888621.3.
(Continued)

*Primary Examiner* — Dang Le
(74) *Attorney, Agent, or Firm* — Posz Law Group, PLC

(57) ABSTRACT

The motor includes a motor body to rotate a shaft by generating a rotating magnetic field; a bearing supporting the shaft; and a bracket being electrically non-conductive, surrounding an outer periphery of the bearing, and supporting the bearing, wherein the bracket is not in contact with any member formed of conductive material at an outer periphery of the bracket.

3 Claims, 4 Drawing Sheets

(51) Int. Cl.
  *H02K 5/10* (2006.01)
  *H02K 5/173* (2006.01)
  *F25B 31/02* (2006.01)

(56) References Cited

U.S. PATENT DOCUMENTS

| 8,096,043 B2* | 1/2012 | Hargraves | F04B 17/03 |
| | | | 29/596 |
| 2004/0183386 A1 | 9/2004 | Kuwert | |
| 2012/0293027 A1* | 11/2012 | Sakurada | H02K 5/10 |
| | | | 310/89 |
| 2015/0162798 A1 | 6/2015 | Ozawa et al. | |

FOREIGN PATENT DOCUMENTS

| JP | 52-045002 A | 4/1977 |
| JP | 54-010984 A | 1/1979 |
| JP | H07-250461 A | 9/1995 |
| JP | H09-154260 A | 6/1997 |
| JP | H10-075551 A | 3/1998 |
| JP | 2007-159302 A | 6/2007 |
| JP | 2007-252096 A | 9/2007 |
| JP | 2007-274850 A | 10/2007 |
| JP | 2009-225601 A | 10/2009 |
| JP | 2010-041812 A | 2/2010 |
| JP | 2012-152094 A | 8/2012 |
| KR | 2008-0105795 A | 12/2008 |
| WO | 2013/069685 A1 | 5/2013 |

OTHER PUBLICATIONS

Office Action dated Apr. 12, 2017 issued in corresponding CN patent application No. 201380077960.1 (and English translation).
International Search Report of the International Searching Authority dated Sep. 17, 2013 for the corresponding international application No. PCT/JP2013/068293 (and English translation).
Japanese Office Action dated Oct. 18, 2016 in the corresponding JP application No. 2015-524967. (English translation attached).
Office Action dated Nov. 7, 2017 issued in corresponding EP patent application No. 13 888 621.3.
Office Action dated Oct. 27, 2017 issued in corresponding CN patent application No. 201380077960.1 (and English translation).
Office Action dated Mar. 5, 2018 issued in corresponding CN patent application No. 201380077960.1 (and English translation).

* cited by examiner

MOTOR AND AIR-CONDITIONING APPARATUS

CROSS REFERENCE TO APPLICATION

This application is a U.S. national stage application of International Application No. PCT/JP2013/068293 filed on Jul. 3, 2013, the disclosure of which is incorporated by reference.

TECHNICAL FIELD

The present invention relates to a motor and an air-conditioning apparatus using the motor.

BACKGROUND ART

When a motor is operated by using an inverter, a noise is generated by the motor due to a switching operation of a transistor mounted on a circuit. In order to reduce the noise generated by the motor, a carrier frequency of the inverter is conventionally increased. While a shaft voltage is generated in the shaft of the motor by electromagnetic induction, the shaft voltage increases with increase of the carrier frequency of the inverter, and accordingly, an electrical potential difference between the inner ring and the outer ring of the bearing, which supports the shaft, increases. As a result, a substantial amount of electrical current flows in the bearing. This causes corrosion on an orbit surface which extends in a circumferential direction of the inner ring and the outer ring of the bearing and a rolling surface of a rolling element interposed between the inner ring and the outer ring, which is called electric corrosion. When the electric corrosion is generated on the bearing, a noise is generated by the bearing or a durability of the bearing is reduced. In order to prevent the electric corrosion of the bearing, techniques have been proposed as described below.

Patent Literature 1 discloses a brushless motor in which a stator core and a bracket that supports a bearing is short-circuited via a core connecting terminal (cable) and a bracket connecting terminal (cable). This conventional technique attempts to decrease a voltage applied to the bearing by a short circuit between the stator core and the bracket and reduce electric corrosion of the bearing.

Patent Literature 2 discloses a fan driving electric motor in which an insulator is interposed between a metal motor case and a bearing which is disposed in the motor case. An electric current which flows in the shaft is transmitted to an inner ring of the bearing supporting the shaft, and then, flows from the inner ring via a rolling element to be transmitted to the outer ring and then to the motor case. The technique of Patent Literature 2 attempts to prevent an electric current from flowing from the outer ring to the motor case by providing an insulator between the outer ring of the bearing and the motor case and reduce electric corrosion of the bearing.

CITATION LIST

Patent Literature

Patent Literature 1: Japanese Unexamined Patent Application Publication No. 2007-159302 (claim 1, FIG. 1)
Patent Literature 2: Japanese Unexamined Patent Application Publication No. H10-75551 (claim 1, FIG. 2)

SUMMARY OF INVENTION

Technical Problem

However, in the brushless motor disclosed in Patent Literature 1, since the core connecting terminal and the bracket connecting terminal which cause short-circuit between the stator core and the bracket are necessary, a configuration of the brushless motor becomes complicated and the cost increases. Further, in the fan driving motor disclosed in Patent Literature 2, although the insulator is provided between the metal motor case and the bearing, a weak electric current flows through the insulator with increase of the voltage that drives the motor. Accordingly, electric corrosion of the bearing is not sufficiently prevented.

The present invention has been made in view of the above problem, and provides a motor that prevents electric corrosion of a bearing with a simple configuration, and an air-conditioning apparatus having the motor.

Solution to Problem

The motor according to the present invention includes a motor body to rotate a shaft by generating a rotating magnetic field; a bearing supporting the shaft; and a bracket being electrically non-conductive, surrounding an outer periphery of the bearing, and supporting the bearing, wherein the bracket is not in contact with any member formed of conductive material at an outer periphery of the bracket.

Advantageous Effects of Invention

According to the present invention, a conductive material is not in contact with the outer periphery of the bracket which holds the bearing. Accordingly, an electric current can be prevented from flowing in the bearing, and electric corrosion of the bearing can be reduced.

DESCRIPTION OF EMBODIMENTS

With reference to the drawings, an Embodiment of a motor and an air-conditioning apparatus according to the present invention will be described. The following description of Embodiment is not intended to limit the present invention. Further, throughout the drawings including FIG. 1, the relationship in size of components may not be to scale.

Embodiment 1

Figure 1:
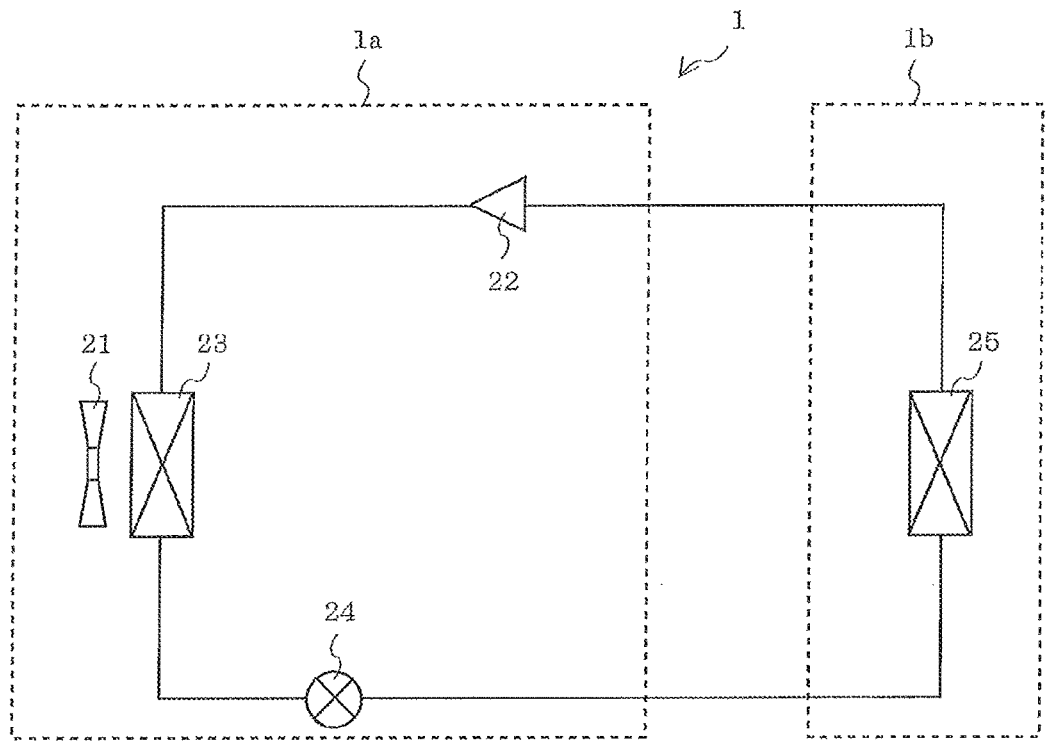
FIG. 1 is a schematic view which shows an air-conditioning apparatus 1 according to Embodiment 1.

FIG. 1 is a schematic view which shows an air-conditioning apparatus 1 according to Embodiment 1. With reference to FIG. 1, the air-conditioning apparatus 1 will be described. As shown in FIG. 1, the air-conditioning apparatus 1 includes an outdoor unit 1a and an indoor unit 1b. The outdoor unit 1a includes a blower device 21, a compressor 22, a first heat exchanger 23 and an expansion unit 24, and the indoor unit 1b includes a second heat exchanger 25. The blower device 21 exhausts air after heat exchange by the first heat exchanger 23 to the outside of the outdoor unit 1a. The compressor 22, the first heat exchanger 23, the expansion unit 24 and the second heat exchanger 25 are connected by a pipe, and refrigerant circulates through the pipe. Accordingly, a refrigerant circuit is formed.

Figure 2:
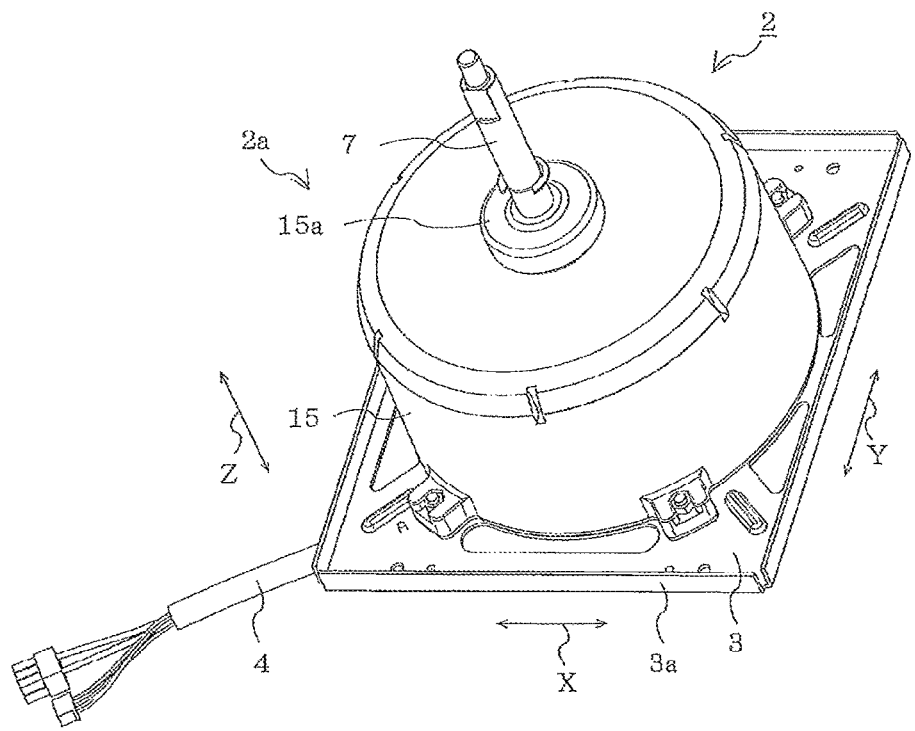
FIG. 2 is a perspective view which shows a motor 2 according to Embodiment 1.

The motor 2 which is used for the blower device 21 is described. FIG. 2 is a perspective view which shows a motor 2 according to Embodiment 1. As shown in FIG. 2, the motor 2 includes a motor body 2a that generates a rotating magnetic field to rotate a shaft 7, and a base 3 on which the motor body 2a is mounted. The base 3 is formed, for example, in a rectangular shape and has a periphery which is bent to form a bending section 3a. Further, an end of a terminal cable 4 is connected to the base 3, and the other end of the terminal cable 4 is connected to a power supply (not shown in the figure) disposed in the outdoor unit 1a. The power supply supplys power to the motor 2 via the terminal cable 4.

Figure 3:
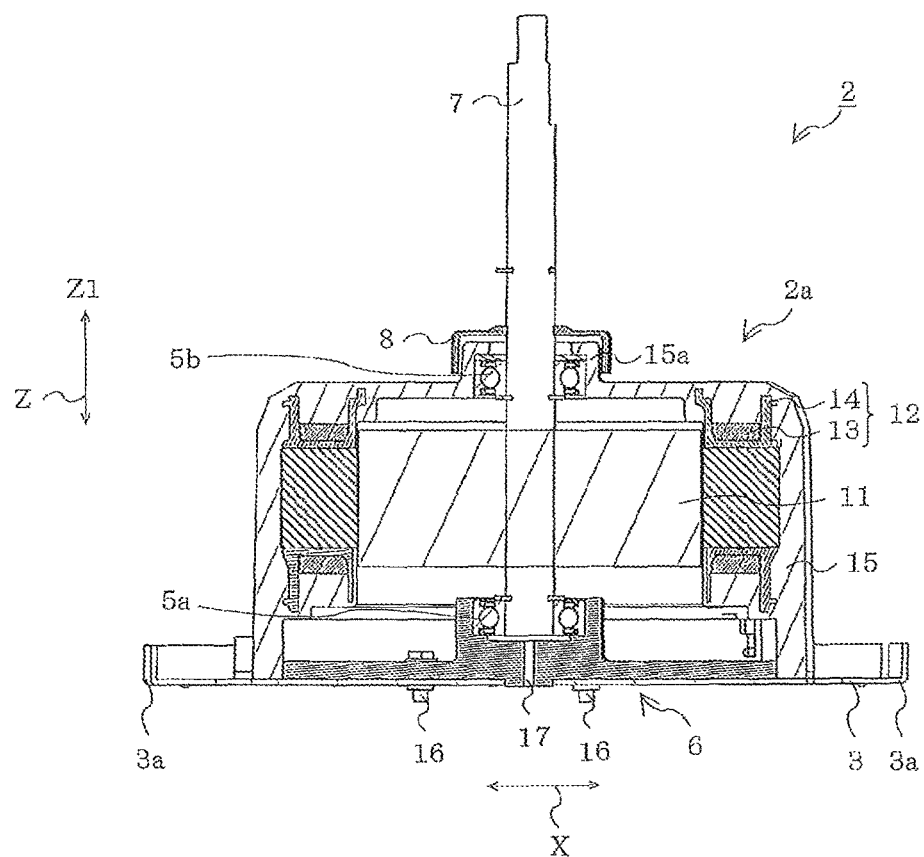
FIG. 3 is a sectional view which shows the motor 2 according to Embodiment 1.

Next, the motor body 2a, a first bearing 5a, a second bearing 5b and a bracket 6 will be described. FIG. 3 is a sectional view which shows the motor 2 according to Embodiment 1. A bracket 6 which is electrically non-conductive is mounted on an underside of the motor body 2a, and the bracket 6 is fastened on an upper surface of the base 3 by a screw 16. A rod-shaped shaft 7 is disposed at the center of the bracket 6. The first bearing 5a is mounted on a proximal end of the shaft 7, and the shaft 7 is supported by the first bearing 5a. The bracket 6 surrounds an outer periphery of the first bearing 5a and holds the first bearing 5a. Further, a drainage hole 17 is formed at the center of the bracket 6 so as to extend in a direction parallel to the shaft 7. The drainage hole 17 is provided to allow water or the like to be discharged to the outside of the motor 2 when water or the like leaks into the motor 2.

Further, a rotor 11 having a cylindrical shape is fixed around the shaft 7 at an upper position of the bracket 6 (in the arrow Z1 direction) and coaxially with the shaft 7. Further, a stator 12 having a cylindrical shape is fixed around the rotor 11 and coaxially with the shaft 7. The stator 12 is composed of a stator coil 13, an insulator 14 around which the stator coil 13 is wound. The stator 12 generates a rotating magnetic field by an electric current which flows in the stator coil 13 and rotate the rotor 11 to follow the rotating field in a synchronous manner. By the rotation of the rotor 11, the shaft 7 disposed at the center of the rotor 11 rotates.

Further, a second bearing 5b is disposed at an upper position of the rotor 11 (in the arrow Z1 direction). The second bearing 5b and the first bearing 5a contribute to a smooth rotation of the shaft 7. Further, a housing 15 protects the rotor 11, the stator 12, the first bearing 5a and the second bearing 5b and forms an outer cover of the motor 2. The housing 15 may be a mold that seals those components.

Further, the housing 15 extends along the shaft 7, and includes a bearing housing 15a that houses a second bearing 5b. A flinger 8 having a bottomed cylindrical shape is fixed to the shaft 7 at an upper position of the bearing housing 15a (in the arrow Z1 direction) so as to surround the bearing housing 15a. The flinger 8 prevents a foreign substance such as water from leaking into the motor 2, that is, into the housing 15.

Figure 4:
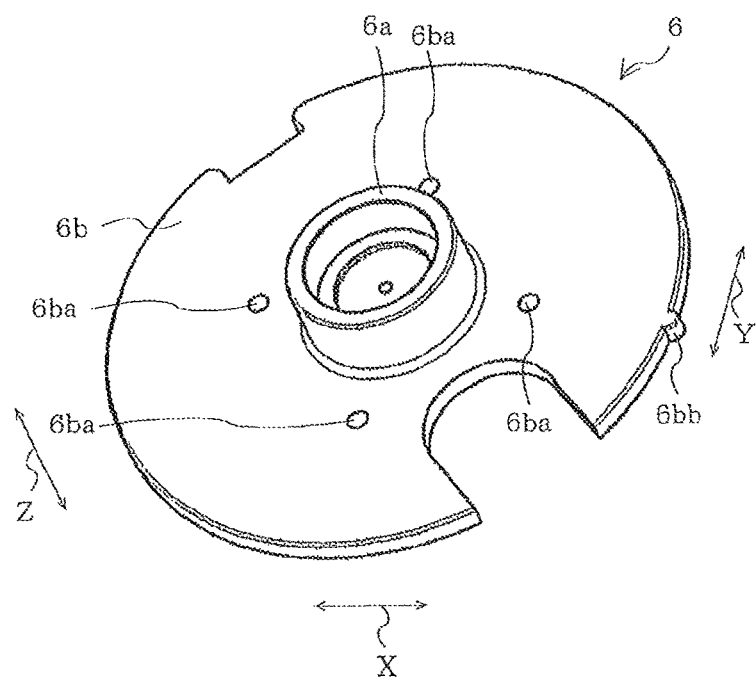
FIG. 4 is a perspective view which shows a bracket 6 according to Embodiment 1.
Figure 5:
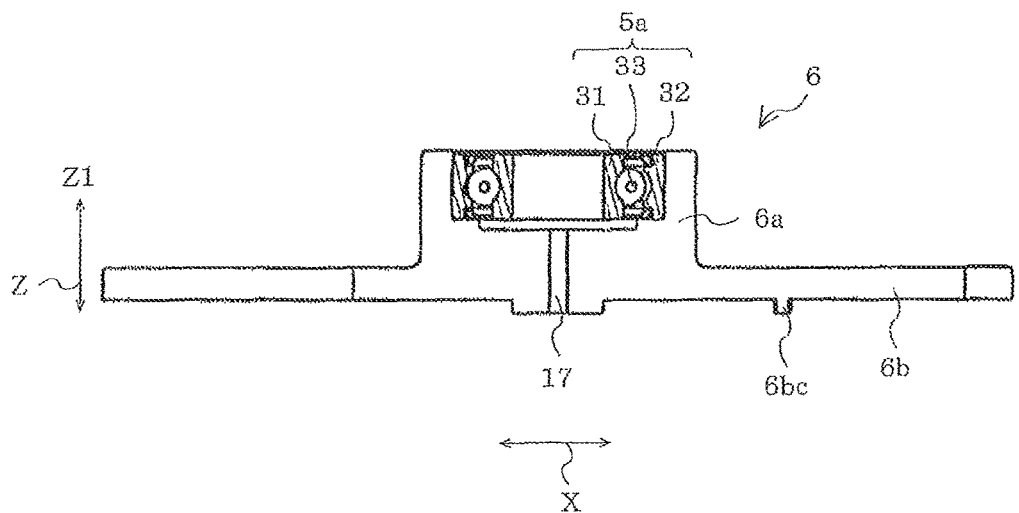
FIG. 5 is a sectional view which shows the bracket 6 according to Embodiment 1.

Next, the bracket 6 will be described in detail. FIG. 4 is a perspective view which shows the bracket 6 according to Embodiment 1. FIG. 5 is a sectional view which shows the bracket 6 according to Embodiment 1. As shown in FIG. 4, the bracket 6 includes, for example, a cylindrical bracket body 6a disposed at the center of the bracket 6, and a flange 6b which extends from an outer periphery of the bracket body 6a in a circumferential direction. As shown in FIG. 5, the first bearing 5a is disposed in the bracket body 6a. The first bearing 5a includes an outer ring 32 having an outer periphery held by the bracket 6, an inner ring 31 rotatably connected to the outer ring 32 and fixed to the shaft 7, and a rolling element 33 interposed between the inner ring 31 and the outer ring 32 so as to connect the inner ring 31 and the outer ring 32. The outer periphery of the bracket 6 is not in contact with a conductive member. As described above, the bracket 6 is non-conductive and serves as an insulator which prevents an electric current from the shaft 7 from leaking to the outside via the inner ring 31 of the first bearing 5a through a surface of the outer ring 32 which is in contact with the bracket 6.

Further, a screw hole 6ba is formed on the flange 6b, for example, at a position spaced from the bracket body 6a, and the screw 16 is inserted into the screw hole 6ba to fasten the bracket 6 to the base 3. In addition, a side surface positioning pin 6bb is disposed on a side surface of the flange 6b so that positions of the bracket 6 and the housing 15 are fixed in position by the side surface positioning pin 6bb. A lower surface positioning pin 6bc is disposed on a lower surface of the flange 6b so that positions of the bracket 6 and the base 3 are fixed in position by the lower surface positioning pin 6bc.

As described above, the bracket 6 is non-conductive and may be made of a material such as a thermosetting resin. Further, the thermosetting resin is preferably a bulk molding compound (BMC). The BMC contains a matrix made of unsaturated polyester resin as a main component, thermoplastic polymer as a low constrictive agent, hardner, filler, mold-releasing agent, which are evenly mixed, and fiber as an enforcement material. The BMC has good mechanical strength, electric performance, heat resistance and water resistance, and particularly, good dimensional accuracy. Further, the bracket 6 is not limited to a thermosetting resin, and may be a thermoplastic resin. Although the thermoplastic resin has a dimensional accuracy slightly lower than that of a thermosetting resin, a desired dimensional accuracy may be achieved by an additional processing or the like.

Figure 6:
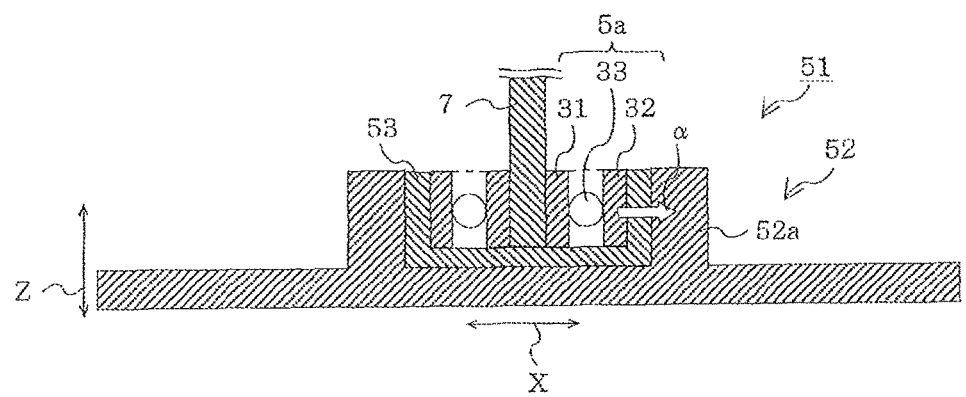
FIG. 6 is a sectional view which shows a working effect of a motor 51 of a comparative example 1.
Figure 7:
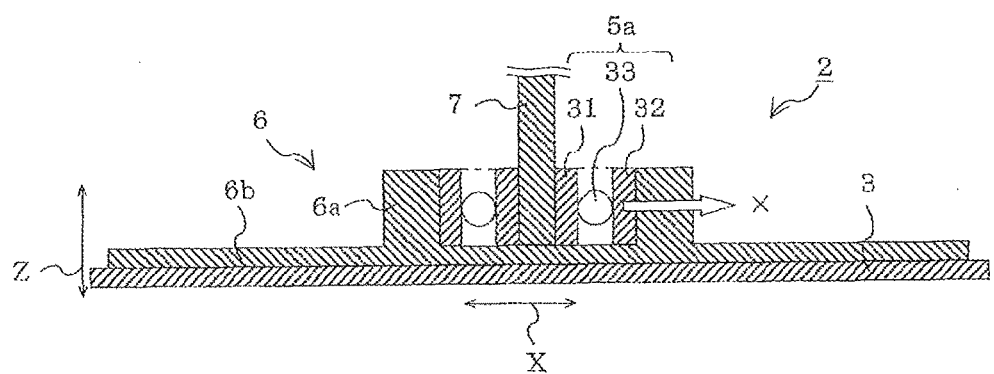
FIG. 7 is a sectional view which shows a working effect of the motor 2 according to Embodiment 1.

Next, a working effect of the motor 2 according to Embodiment 1 will be described. For convenience of understanding of an operation of the motor 2 of Embodiment 1, the description is made in comparison with comparative example 1 of the motor 2 of Embodiment 1. FIG. 6 is a sectional view which shows an operation of a motor 51 of comparative example 1, and FIG. 7 is a sectional view which shows an operation of the motor 2 of Embodiment 1. First, the motor 51 of comparative example 1 will be described. As shown in FIG. 6, the motor 51 of comparative example 1 includes a cylindrical metal bracket body 52a disposed at the center of a metal bracket 52 made of aluminum and being plate-shaped, and an insulator 53 made of, for example, PET (polyethylene terephthalate) and having a bottomed cylindrical shape is disposed along an inner peripheral surface of the metal bracket body 52a. Further, the first bearing 5a is disposed in the insulator 53 so that the shaft 7 is inserted into the first bearing 5a. The first bearing 5a includes the inner ring 31, the outer ring 32, and the rolling element 33 interposed between the inner ring 31 and the outer ring 32.

In the motor 51 of comparative example 1, an electric current which flows in the shaft 7 is transmitted to the inner ring 31 of the first bearing 5a, and then flows from the inner ring 31 via the rolling element 33 to the outer ring 32. When an electric current which flows in the shaft 7 is weak, the electric current which is transmitted to the outer ring 32 is not transmitted to the metal bracket 52 since the insulator 53 is disposed between the outer ring 32 and the metal bracket 52. However, since an electric current which flows in the shaft 7 increases with increase of a drive voltage of the motor 51, the electric current which is transmitted to the outer ring 32 is not sufficiently insulated by the insulator 53 and may be transmitted to the metal bracket 52 as indicated by the arrow α. Further, since the first bearing 5a has an orbit surface of the outer ring 32 in the circumferential direction which is larger than an end face of the outer ring 32 in the axial direction, a larger amount of electric current leaks from the end face than from the orbit surface.

On the other hand, as shown in FIG. 7, the outer periphery of the bracket 6 of the motor 2 of Embodiment 1 is not in contact with a conductive member such as the metal bracket 52. Accordingly, electric potential difference is not generated between the shaft 7 and the outer ring 32 of the first bearing 5a, and an electric current is prevented from leaking from the outer ring 32. That is, in the motor 2 of Embodiment 1, an electric current is prevented from flowing in the first bearing 5a. Specifically, if the same drive voltage is applied to the motor 51 of comparative example 1 and the motor 2 of Embodiment 1, a shaft current which flows in the shaft 7 of the motor 2 according to Embodiment 1 is 1/10 or lower than a shaft current of the motor 51 of the comparative example 1. As described above, the motor 2 of Embodiment 1 can reduce the shaft current which flows through the shaft 7. Therefore, the configuration of Embodiment 1 can prevent electric corrosion of the first bearing 5a and improve durability of the first bearing 5a.

Further, in Embodiment 1, when the bracket 6 is made of BMC, the bracket 6 has high ability to hold the first bearing 5a since the BMC has high dimensional accuracy as describe above. Accordingly, unlike the motor 51 of comparative example 1, the metal bracket 52 which is made of a conductive material does not have to complement a force to hold the first bearing 5a, and accordingly, there is no need of providing a conductive material such as the metal bracket 52 on the outer periphery of the bracket 6. Further, when the bracket 6 is made of BMC, the flange 6b of the bracket 6 can be formed with high dimensional accuracy. Accordingly, the motor 2 can be assembled with high accuracy by fitting the flange 6b and the housing 15. Therefore, a small tolerance zone of a coaxial degree of the first bearing 5a, the second bearing 5b and the shaft 7, which are components of the motor 2, is achievable.

Embodiment 2

Figure 8:
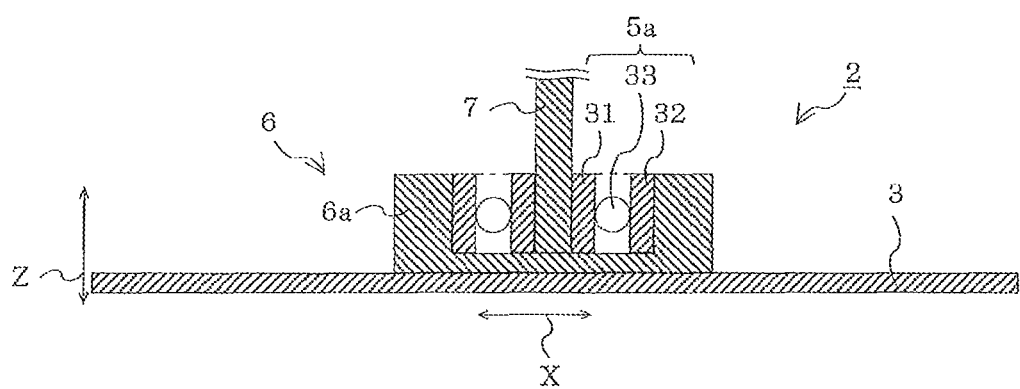
FIG. 8 is a sectional view which shows the motor 2 according to Embodiment 2.

Next, the motor 2 according to Embodiment 2 will be described. FIG. 8 is a sectional view which shows the motor 2 of Embodiment 2. Embodiment 2 differs from Embodiment 1 in that the flange 6b is not formed in the bracket 6. In Embodiment 2, the same reference numbers are used for the same elements of Embodiment 1 and the explanation thereof is omitted, and the description will be made focusing on differences from Embodiment 1.

In Embodiment 2, as shown in FIG. 8, the flange 6b is not formed on the bracket 6, and the bracket 6 includes only the bracket body 6a. As described above, a larger amount of electric current which flows in the first bearing 5a leaks from the orbit surface than from the end surface. In Embodiment 2, although the flange 6b is not formed, the bracket body 6a is in contact with the outer ring 32 of the first bearing 5a. Embodiment 2 has an effect of reducing the cost for manufacturing the flange 6b in addition to the effect obtained in Embodiment 1.

Embodiment 3

Figure 9:
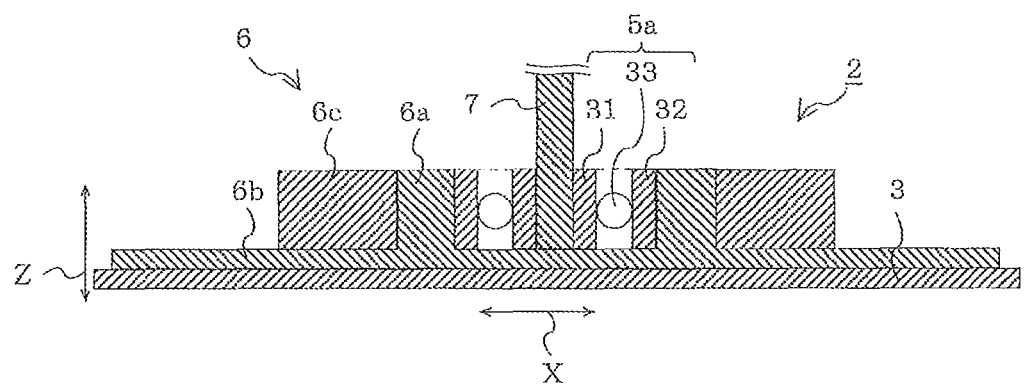
FIG. 9 is a sectional view which shows the motor 2 according to Embodiment 3.

Next, the motor 2 according to Embodiment 3 will be described. FIG. 9 is a sectional view which shows the motor 2 according to Embodiment 3. Embodiment 3 differs from Embodiment 1 in that the bracket 6 includes an enforcement bracket 6c made of non-conductive material on the outer periphery of the bracket body 6a. In Embodiment 3, the same reference numbers are used for the same elements of Embodiment 1 and the explanation thereof is omitted, and the description will be made focusing on differences from Embodiment 1.

In Embodiment 3, as shown in FIG. 9, the bracket 6 includes the enforcement bracket 6c. That is, the bracket 6 includes the bracket body 6a, the flange 6b and the enforcement bracket 6c, and the bracket body 6a, the flange 6b and the enforcement bracket 6c are made of only non-conductive material. Since the enforcement bracket 6c is provided, Embodiment 3 can improve the bracket 6 to hold the first bearing 5a with higher reliability, in addition to the effect obtained in Embodiment 1.

Although the above description shows an example in which the first bearing 5a and the second bearing 5b are formed by a ball bearing (rolling bearing), the first bearing 5a and the second bearing 5b may be a slide bearing. In this case, similar to the case of ball bearing, the effect of preventing an electric current flow and reducing electric corrosion can also be achieved.

REFERENCE SIGNS LIST 1 air-conditioning apparatus 1a outdoor unit 1b indoor unit motor 2a motor body 3 base 3a bending section 4 terminal cable 5a first bearing 5b second bearing 6 bracket 6a bracket body 6b flange 6ba screw hole 6bb side surface positioning pin 6bc lower surface positioning pin 6c enforcement bracket 7 shaft 8 flinger 11 rotor 12 stator 13 stator coil 14 insulator 15 housing 15a bearing housing 16 screw 17 drainage hole 21 blower device 22 compressor 23 first heat exchanger 24 expansion unit 25 second heat exchanger 31 inner ring 32 outer ring 33 rolling element 51 motor 52 metal bracket 52a metal bracket body 53 insulator

The invention claimed is:

1. A motor comprising:
a housing covering the motor;
a motor body to rotate a shaft by generating a rotating magnetic field;
a bearing supporting the shaft; and
a bracket being electrically non-conductive, surrounding an outer periphery of the bearing and supporting the bearing,
wherein
the bracket includes
an unsaturated polyester resin as a main component,
a bracket body provided in a center of the bracket,
a flange extending from an outer periphery of the bracket main body in a radial direction, and a side surface positioning pin disposed on a side surface of the flange, the side surface positioning pin is configured to enable a fixing of a relative position of the bracket to the housing, the bracket is not in contact with any member formed of conductive material at an outer periphery of the bracket, the bearing includes
   an outer ring having an outer periphery supported by the bracket,
   an inner ring rotatably connected to the outer ring and fixed to the shaft, and
   a rolling element, separate from the inner ring and the outer ring, interposed between the inner ring and the outer ring so as to connect the inner ring and the outer ring, and the bracket serves as an insulator preventing an electric current flowing through the shaft to the bracket from leaking to an outside via the inner ring through a surface of the outer ring, the surface being in contact with the bracket.

2. An air-conditioning apparatus comprising:

an outdoor unit including a blower device having the motor of claim 1, a compressor, a first heat exchanger and an expansion unit; and an indoor unit including a second heat exchanger, wherein the compressor, the first heat exchanger, the expansion unit and the second heat exchanger are connected by a pipe so as to form a refrigerant circuit in which refrigerant circulates.

3. The motor of claim 1, wherein the bracket is a bulk molding compound containing the unsaturated polyester resin and a fiber.

* * * * *